United States Patent [19]

Christensen

[11] 4,040,663
[45] Aug. 9, 1977

[54] SEAT BACK TILT CONTROL UNIT

[76] Inventor: Fredrich M. Christensen, 10256 Prairie Road, Omaha, Nebr. 68134

[21] Appl. No.: 742,254

[22] Filed: Nov. 16, 1976

[51] Int. Cl.² ............................................. A47C 1/024
[52] U.S. Cl. ................................ 297/361; 74/424.8 R
[58] Field of Search ............... 297/361, 362, 355, 354, 297/325, 328, 347, 348; 108/7, 147; 248/397, 405, 406, 422; 74/424.8 R

[56] References Cited

U.S. PATENT DOCUMENTS

| | | | |
|---|---|---|---|
| 1,813,352 | 7/1931 | Haberlin | 74/424.8 R |
| 2,729,113 | 1/1956 | Blanchard | 74/424.8 R X |
| 2,748,835 | 6/1956 | Barecki | 248/397 |
| 3,022,681 | 2/1962 | Cook | 74/424.8 R |
| 3,220,718 | 11/1965 | Wikkerink | 74/424.8 R X |
| 3,741,028 | 6/1973 | White | 74/424.8 R X |

FOREIGN PATENT DOCUMENTS

| | | | |
|---|---|---|---|
| 24,904 | 5/1883 | Germany | 297/362 |
| 6,179 | 3/1903 | United Kingdom | 108/7 |
| 1,281,845 | 7/1972 | United Kingdom | 297/361 |

Primary Examiner—Roy D. Frazier
Assistant Examiner—William E. Lyddane
Attorney, Agent, or Firm—Robert A. Ostmann

[57] ABSTRACT

The disclosure concerns adjusting mechanism for controlling tilting of the back of a locomotive engineer's seat. The improved mechanism is a self-contained, protected unit which affords positive, reliable control action. The unit may be applied to standard seats now in service as a replacement for the conventional adjusting mechanism, or it may be installed as original equipment during manufacture of new seats.

6 Claims, 7 Drawing Figures

SEAT BACK TILT CONTROL UNIT

BACKGROUND AND SUMMARY OF THE INVENTION

The conventional engineer's seats employed on railway locomotives have tilting backs which are positioned manually and are retained in the selected position by a retractable pin type of locking device. My experience shows that these locking devices become unreliable under service conditions as a result, for example, of wear or damage. On occasion, sudden movement of the seat back resulting from unintended disengagement of the pin lock has resulted in personal injuries, and has given rise to law suits for damages.

The object of this invention is to provide an alternative to the tilt locks now being used which is relatively inexpensive and easy to manufacture and install, and yet is superior from both the safety and operational standpoints. According to the invention, the improved mechanism is a self-contained unit which, with but a simple change in the mounting bracket, is adaptable to most, if not all, of the engineer's seats now in service. The unit incorporates an adjusting screw which affords positive, infinitely variable control of the angle of tilt, is unaffected to any appreciable extent by wear, and, because it is an irreversible motion transmitter, inherently constitutes a reliable retainer for the seat back. In addition, the vital parts of the unit are protected, as far as practicable, by a housing, so malfunctions attributable to accidental damage or tampering are minimized. Finally, the new unit is suitable for use either as original equipment for new seats or as a replacement for the tilt lock employed on existing seats.

BRIEF DESCRIPTION OF THE DRAWINGS

The preferred embodiment of the invention is described herein in detail with reference to the accompanying drawings, in which.

DESCRIPTION OF PREFERRED EMBODIMENT

Figure 1:
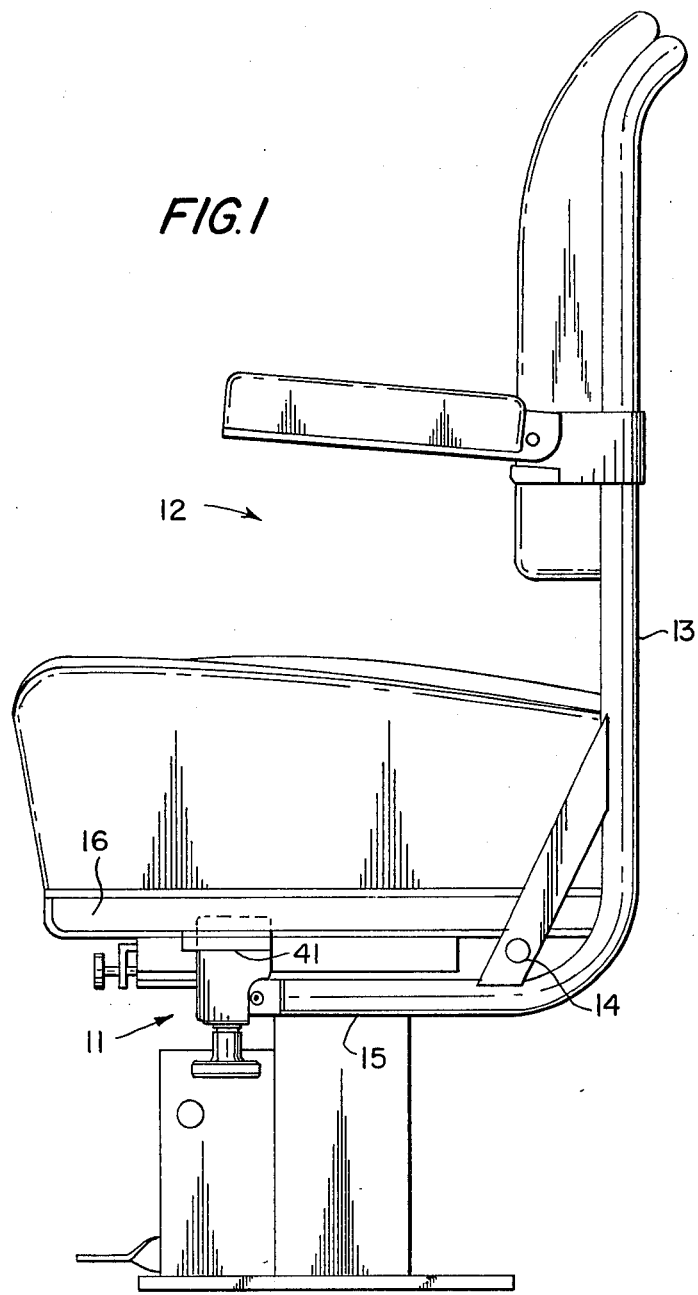
FIG. 1 is a side elevation view of one type of engineer's seat incorporating the invention.
Figure 2:
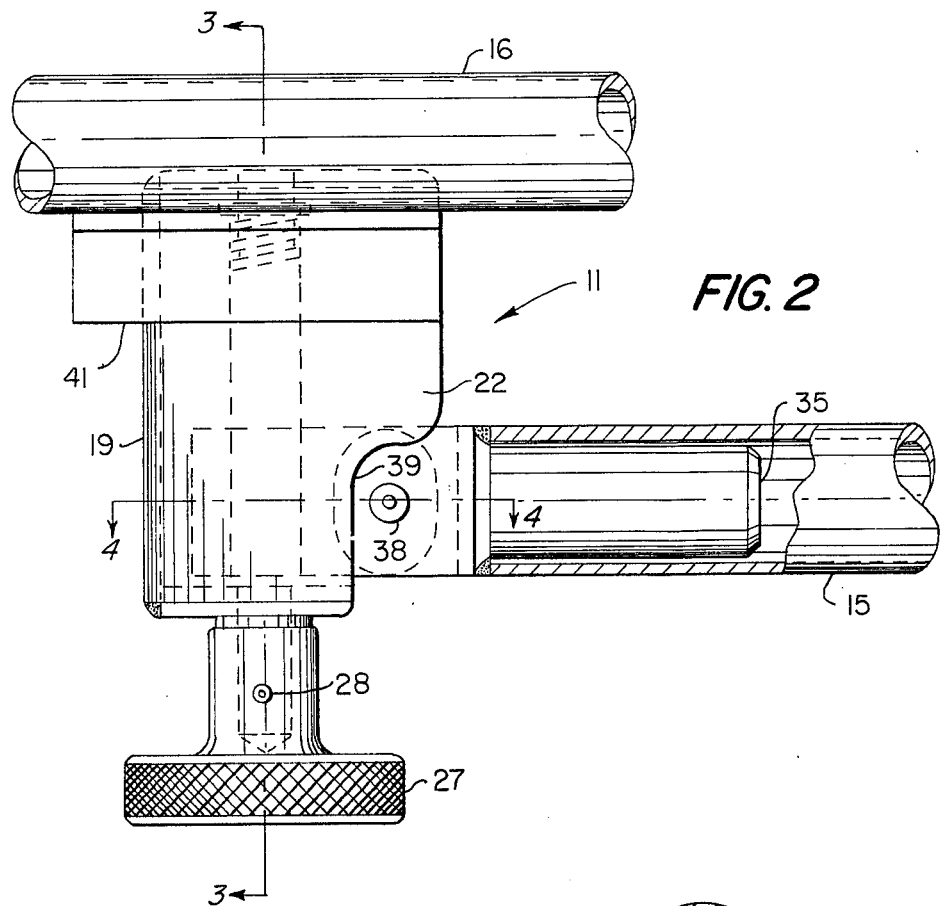
FIG. 2 is an enlarged view of a portion of FIG. 1 showing the installation of the tilt control unit.
Figure 4:
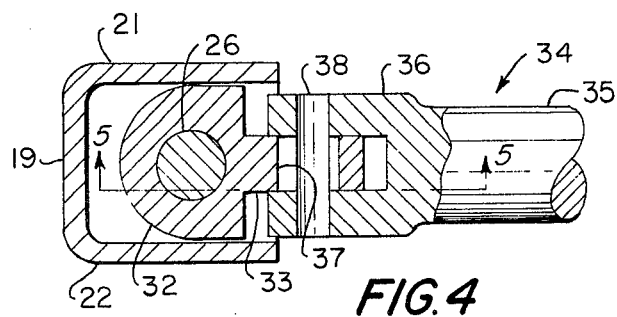
FIG. 3 and 4 are sectional views taken on lines 3—3 and 4—4, respectively, of FIG. 2.
Figure 5:
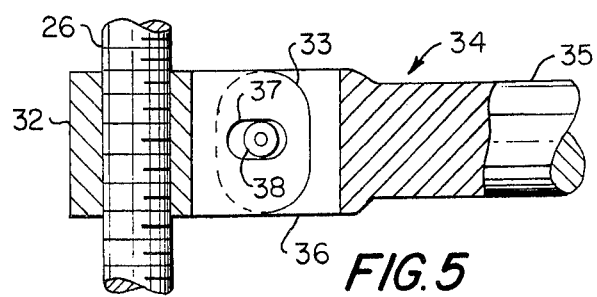
FIG. 5 is a sectional view taken on line 5—5 of FIG. 4.
Figure 3:
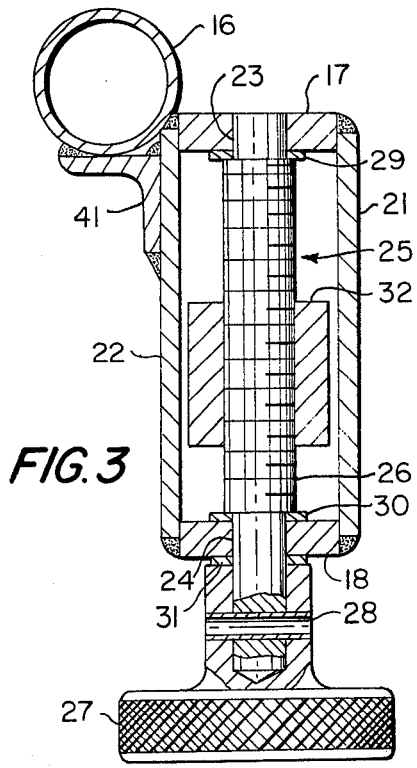

As shown in FIG. 1 the improved tilt control unit 11 is installed on a Coach and Car Company engineer's cab seat 12 and serves to control tilting of the seat back 13 about its pivot 14. The seat 12 is standard, except that the front portion of tubular back frame member 15 has been cut off to remove the original locking pin assembly, and the cooperating retainer plate has been removed from cushion frame member 16.

Referring now to FIGS. 2-5, the improved control unit 11 comprises a housing defined by top and bottom wall members 17 and 18, respectively, which are fitted into and welded or brazed to a U-shaped sheet metal part which provides upstanding front end wall 19 and side walls 21 and 22. Top and bottom wall members 17 and 18 are pierced by aligned bores which receive and journal the reduced diameter end sections 23 and 24 of a vertical shaft 25. This shaft has a central section 26 of larger diameter which is held captive between members 17 and 18, and which is formed with an Acme thread. An actuating knob 27 is fitted onto the end section 24 of shaft 25 and is held in place by a transverse roll pin 28. Washers 29 and 30, interposed between the ends of threaded section 26 and the inside faces of walls 17 and 18, respectively, and washer 31, interposed between knob 27 and the outside face of wall 18, insure smooth operation of shaft 25.

Shaft 25 carries a pivot member 32, which is threaded onto central section 26 and is free to move vertically within the housing of unit 11 as the shaft is rotated. This member 32 includes an integral tongue 33 which projects toward the rear, open end of the housing and is joined, by means of a sliding pivotal connection, to the output or adjusting member 34 of unit 11. Member 34 includes a cylindrical stem 35, formed to fit into the tubular back frame member 15 of seat 12, and a clevis 36 which receives tongue 33. The pivotal connection comprises an elongated slot 37 formed in tongue 33, and a hardened steel roll pin 38 which is driven through clevis 36. The roll pin has a close sliding fit in slot 37, (i.e., clearance in the vertical direction is a minimum) and its axis is normal to the axis of shaft 25.

The housing of unit 11 is provided with a mounting bracket in the form of a simple angle member 41. This part is welded or brazed to the outside face of one of the side walls 21 and 22 near its upper end. The choice between these walls depends upon whether unit 11 is to be located on the right or the left side of the seat. Since most seats in service today have the tilt lock mechanism on the left side, bracket 41 is shown affixed to side wall 22.

To assemble unit 11, pivot member 32, washers 29 and 30 and top and bottom wall members 17 and 18 are placed on shaft 25, and then the wall members are joined to the U-shaped sheet metal housing part. Thereafter, the clevis 36 of adjusting member 34 is placed over tongue 33, and roll pin 38 is driven into place. Finally, washer 31, actuating knob 27, and bracket 41 are installed. It will be noted that installation of the adjusting member 34 after completion of the housing is desirable, as a matter of convenience, and is possible because each of the housing side walls 21 and 22 is formed with a cut-out portion 39 at its lower rear margin which affords access to the sliding pivotal connection. These cut-outs, however, should be kept as small as practicable, so that the vital parts of the unit are housed, and thus protected, throughout a major portion of the range of vertical travel of pivot member 32.

After the original locking mechanism has been removed from seat 12 in the manner mentioned earlier, installation of the new unit 11 may be accomplished by a few simple steps. First, knob 27 is turned to bring pivot member 32 to its lowest position, if it is not already in that position, and seat back 13 is placed and held in its vertical position. Next, unit 11 is positioned on seat 12 so that bracket 41 underlies cushion frame 16, and then slid to the rear to insert stem 35 into tubular back frame member 15. Thereafter, the housing of unit 11 is shifted forward relatively to stem 35 to bring roll pin 38 into contact with the rear wall of slot 37. Finally, stem 35 is brazed to frame member 15, and bracket 41 is brazed to cushion frame 16. Since unit 11 is completely self-contained, installation of the unit requires no special manipulative steps to eliminate binding and insure free movement of its relatively movable parts.

The location of control unit 11 on seat 12 affords to the occupant ready access to actuating knob 27. As the knob is turned, pivot member 32 moves up or down along threaded shaft section 26, and thereby causes adjusting member 34 to tilt seat back 13 in either the clockwise or the counterclockwise direction about its pivot 14. Slot 37, of course, accommodates the fore and aft motion of pin 38 which occurs as an incident to tilting of member 34. Since the threaded connection between shaft 25 and pivot member 32 is an irresversible motion transmitter, unit 11 reliably holds seat back 13 in the position selected by the occupant.

Figure 6:
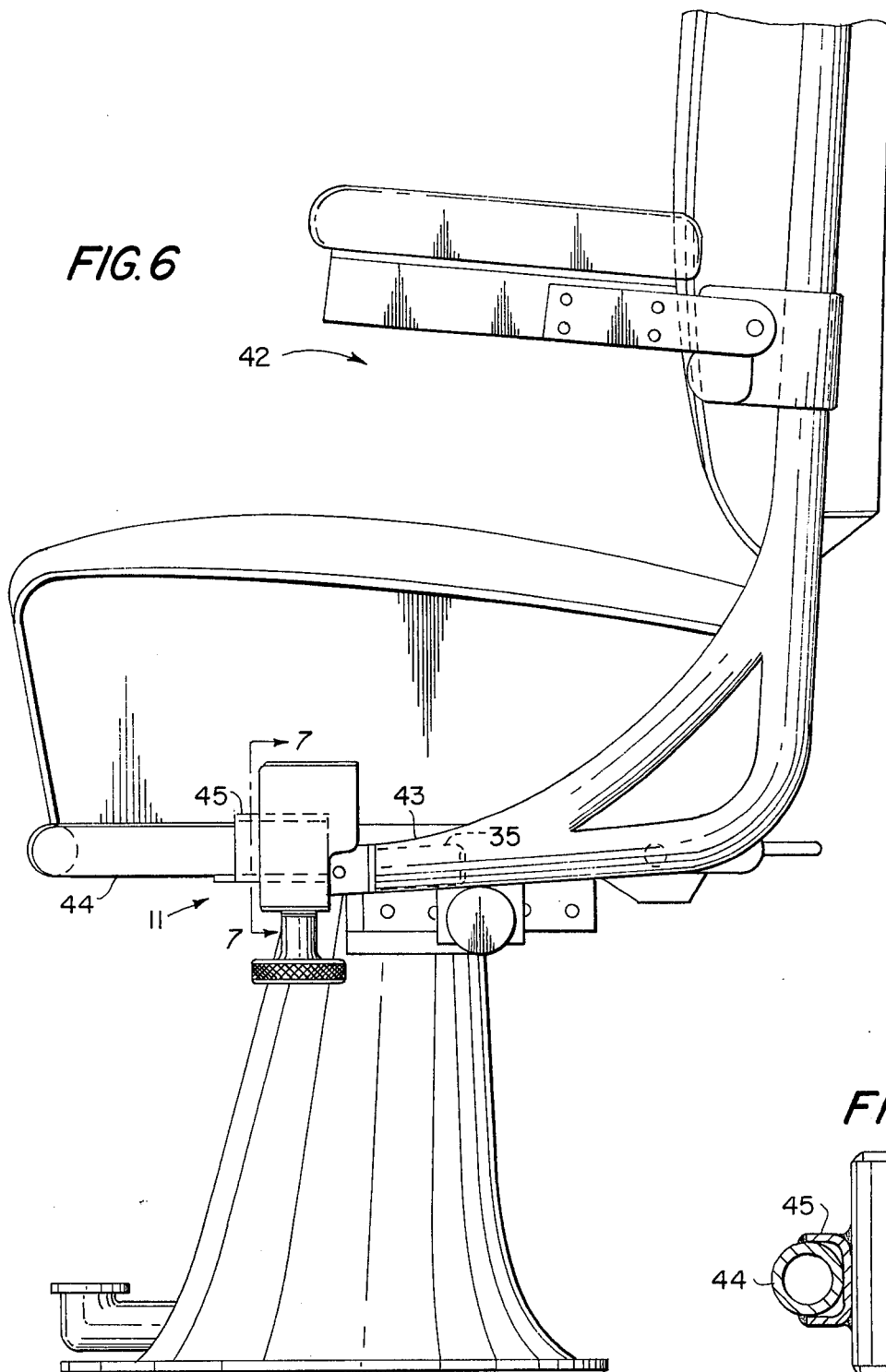
FIG. 6 is a side elevation view of another type of engineer's seat incorporating the invention.
Figure 7:
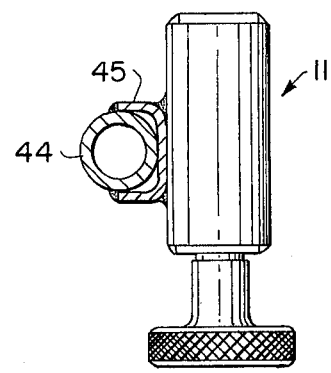
FIG. 7 is an enlarged sectional view taken on line 7—7 of FIG. 6.

The same tilt control unit 11 may also be used on seats marketed by the American Seating Company. FIGS. 6 and 7 shows the unit installed on the company's Model 130 Locomotive Engineer's Seat 42. As in the FIG. 1 embodiment, the original retractable pin locking mechanism is removed, and the stem 35 of the unit 11 is inserted into the tubular back frame member 43 and welded or brazed in place. In this case, however, the housing of unit 11 is attached to the cushion frame member 44 by means of a channel bracket 45 which fits around the frame member.

I claim:

1. A self-contained unit for adjusting the tilt of a chair back relative to the chair seat, the unit comprising
   a. a housing having top and bottom walls, a pair of upright side walls and a front end wall, and being open at the rear end;
   b. bracket means on the outside of one side wall and adapted to be connected to a chair seat;
   c. a vertical shaft supported for rotation and held captive against axial movement by the top and bottom walls, the shaft having a threaded central section within the housing and a plain end section which extends to the exterior of the housing through the bottom wall;
   d. an actuating knob fixed to the plain shaft section outside the housing;
   e. a pivot member threaded onto the central shaft section and being free to move vertically within the housing as the shaft is turned; and
   f. an adjusting member having a portion outside the housing adapted to be connected to a tilting chair back and being joined to the pivot member by a pivotal connection located adjacent the rear end of the housing,
   g. the pivotal connection between the pivot and adjusting members including a pivot pin which is normal to the axis of the shaft, is pressed into one of those members and has a close sliding fit in a slot formed in the other of said members.

2. A unit as defined in claim 1 in which the central threaded section of the shaft is flanked by reduced diameter end sections which are journaled in aligned bores extending through the top and bottom walls; and which includes a pair of washers mounted on said end shaft sections and interposed between the ends of the central threaded section and inside faces of the top and bottom walls.

3. A unit as defined in claim 1 in which the pivot member includes a tongue which projects toward the rear end of the housing and contains said slot; and the adjustingmember includes a clevis which receives said tongue and into which said pivot pin is pressed, and an integral cylindrical stem which serves as said portion adapted to be connected to a tilting chair back.

4. A unit as defined in claim 1 in which the side walls are so shaped that the pivotal connection is shrouded by those walls in a first range of vertical movement of the pivot member, and said connection is exposed in a second range of vertical movement of the pivot member.

5. A unit as defined in claim 4 in which the first range of movement is larger than the second.

6. A unit as defined in claim 1 in which the housing is defined by a U-shaped sheet metal member which forms said front and side walls, and a pair of flat plate members which are welded or brazed to the sheet metal member and serve as said top and bottom walls.

* * * * *